Feb. 21, 1967 D. VON SANDEN ETAL 3,305,641
MEANS FOR AVOIDING DOUBLE CONNECTIONS IN TELEPHONE MULTIPLEX SYSTEMS AND THE LIKE
Filed Oct. 8, 1963
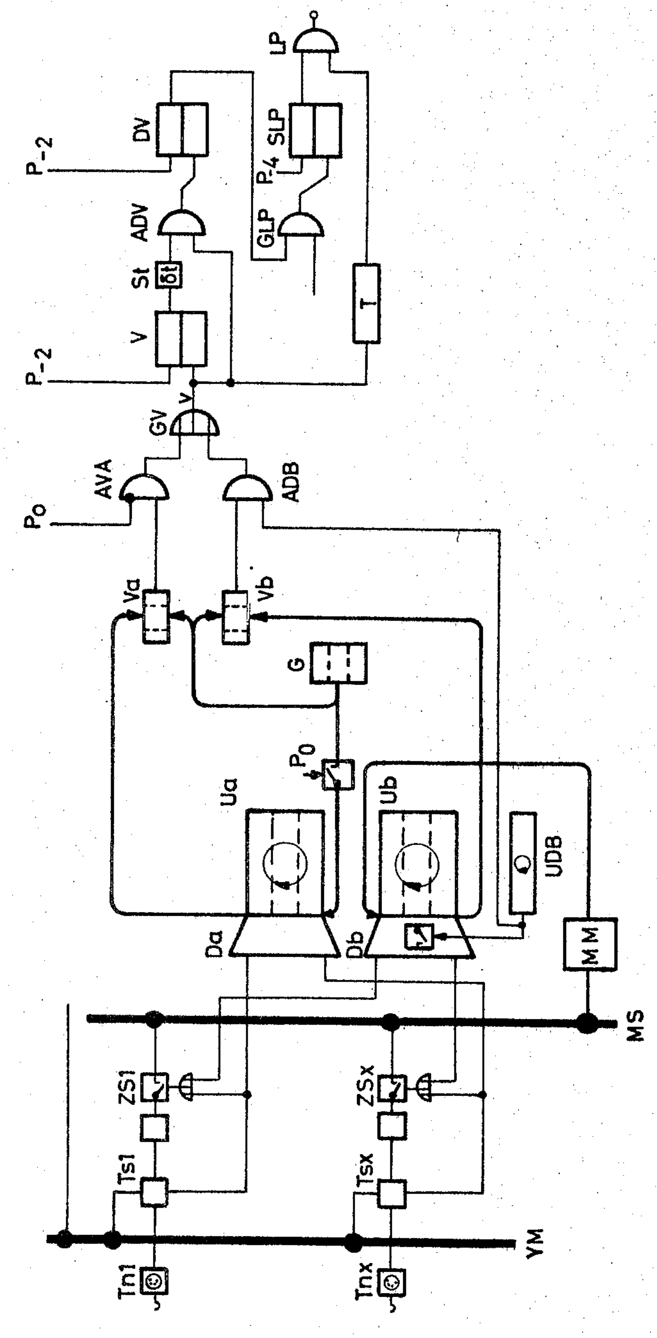

United States Patent Office 3,305,641

Patented Feb. 21, 1967

3,305,641

MEANS FOR AVOIDING DOUBLE CONNECTIONS IN TELEPHONE MULTIPLEX SYSTEMS AND THE LIKE

Dieter Von Sanden, Munich-Solln, Germany, and Hubert Suckfüll, Phoeniz, Ariz., assignors to Siemens & Halske Aktiengesellschaft Berlin and Munich, a corporation of Germany Filed Oct. 8, 1963, Ser. No. 314,687
Claims priority, application Germany, Oct. 12, 1962, S 82,007
7 Claims. (Cl. 179—18)

The invention disclosed herein is concerned with a circuit arrangement for avoiding double connections in a switching system, particularly for telephone purposes.

In dial switching systems, there is the object, inter alia, of avoiding undesired connections between two subscribers who are already connected with each other and a third subscriber, namely, so-called double connections. Such double connections can occur in conventional dial switching systems owing to approximately simultaneous testing of selection devices on one and the same line, as to idle condition of such line and attempting to seize it; since both selection devices find the line idle, the corresponding test switching means can respond with respect to both of the devices and seize the idle line. Such a double seizure can occur more easily, the longer the time span required for the test switching means to respond and thus to occupy the line in question and to block it against being otherwise occupied. Efforts are therefore made in the conventional switching art to keep short the danger period in which double connections can occur.

The more recent switching technique has led, inter alia, to the development of switching systems in which, differing from the conventional switching systems, the intelligence is not stored by way of existing connections, in relays and the like, distributed along the speaking path, but rather in which such intelligence is stored, for example, as the addresses indicating in address storers the subscriber lines to be connected. Such a switching system may be, for instance, a time-multiplex switching system, in which individual subscriber lines can be connected to a multiplex bar via electronic time channel switches which are shifted in phase with respect to each other and control the control pulses associated with the corresponding connections, the control pulses being produced by means of the addresses stored in address storers, and indicating the subscriber lines to be connected. For the monitoring (supervising) of the individual subscriber lines, required in every switching system, as to whether a line loop in question is open or closed, for the purpose of effecting the switching operations which may be necessary, as a function of the condition of the loop or of changes in the condition of loop, there can be provided in such a switching system an address register. Such address register is operative to effect a successive periodic pulse-wise reading of the individual subscriber lines as to their condition of operation, and until the switching operations to be carried out for the corresponding line are terminated, supplies in cyclic succession the address of the subscriber line which has just been read. Since in such a switching system, the switching operations referring to the individual subscribers are carried out from the very start one after the other, that is, separated in time from each other, it is possible per se, to avoid undesired double connections from the start. A prerequisite therefor is a proper transfer and processing of the information required for the making and release of connections. However, it is conceivable that unfavorable circumstances, for instance, a defective processing of intelligence, might nevertheless lead to an undesired double connection. The invention described below, however, shows a way of avoiding in such a switching system undesired double connections without great expenditure.

The present invention relates to a circuit arrangement for avoiding double connections in a switching system, particularly for telephone purposes, in which the addresses indicating the subscriber lines to be connected in each case with each other are stored in address storers and in which for the successive periodic pulse-wise reading of the individual subscriber lines as to their condition of operation, there is provided an address register which, in cyclic succession, supplies in each case the address of the subscriber line which has just been read, until the switching operations which have been effected for the subscriber line in question, based upon its condition of operation, are completed. Such circuit arrangement is characterized by the fact that upon the comparison of the subscriber address just supplied by the address register with the addresses of subscriber lines participating in connections recorded in an address storer, it counts the cases of occurrence of identity of address and upon the occurrence at least twice of identity of address, gives off a signal which indicates a double connection and can be used as criterion for the giving off of a command for the release of those connections in which the subscriber having the address just supplied by the address register is participating. The circuit arrangement in accordance with the invention therefore periodically tests the individual subscriber lines as to whether they are participating in a double connection; the double connection which has erroneously come about can therefore be indicated and released within such a short time that practically no exchange of intelligence can take place between the subscribers participating in an undesired double connection.

It is advantageous in this connection that for the testing of the individual subscriber lines, there can also be used an address register which is present in any event and which supplies, in cyclic succession, the addresses of the individual subscriber lines. If, as has already been proposed, the testing of the idle condition of subscriber lines is effected in each case by comparison of the address of the desired subscriber, supplied by such an address register in the course of its address supplying cycle, with the addresses of the subscribers participating in connections which are recorded in address storers, the address comparators which are present in any event for this purpose can furthermore also be utilized directly for the testing of the subscribers as to whether they are participating in double connections. The circuit arrangement in accordance with the invention therefore requires only a small expenditure. It can advantageously be formed by a bi-stable flip-flop stage and a gate connected to its output, the other input of which gate together with the control input of the bistable flip-flop stage being connected to a line transferring the signal coming from the address comparator upon each identity of an address recorded in an address storer with the subscriber address just supplied by the address register, so that in case of a second or further occurrence of identity of address, a signal which indicates a double connection occurs at the output of the gate. In order to give off a command for the release of the connections in which the subscriber having the address just supplied by the address register has participated, there is advantageously provided a command storer having a command gate connected serially therewith, which gate, by the feeding of the corresponding signal to its control input, makes it possible to give off the command at a desired instant.

The invention will now be described more in detail with reference to the accompanying drawing.

The drawing shows by way of example an embodiment of a circuit arrangement in accordance with the invention and the incorporation thereof into a telephone switching system, to the extent necessary for an understanding of the invention.

In the drawing, there is shown, as an example of a telephone switching system a time multiplex telephone switching system in which the addresses indicating the subscriber lines to be connected are stored in address registers, and in which an address register is provided which supplies in cyclic succession the addresses of the individual subscriber line. The construction and manner of operation of the system will be described first.

In this switching system, subscribers T*nl* . . . T*nx* are connected by way of subscriber line circuits T*sl* . . . T*sx* and time channel switches ZS*l* . . . ZS*x*, with a speech multiplex bar MS. The time channel switches ZS*l* . . . ZS*x* are actuated periodically in pulse-like fashion by control pulses which are shifted in phase with respect to each other. The time channel switches of subscribers who are connected with each other are made conductive in synchronism with a control pulse associated with the respective connection. The control pulses are supplied by two address cycling storers U*a* and U*b* having decoders D*a* and D*b* associated therewith. The address storer U*a* is associated with those subscribers who are participating in connections in outgoing traffic, while the address storer U*b* is associated with those subscribers who are participating in connection in incoming traffic. In the address cyclic storers are cycled the addresses of the corresponding subscribers so that such addresses appear periodically at the outputs of the storers. Each address cycling in an address cyclic storer U*a* or U*b*, respectively, has a given cycling phase. The pulse phases of the control pulses actuating the time-channel switches ZS*l* . . . ZS*x* correspond to these cycling phases. The impulses of the different control pulses have the same impulse repetition or sequence frequency, and are so staggered that between two consecutive impulses of a control pulse appears one impulse of each of the other control pulses. To the outputs of the address cycling storers U*a* and U*b*, there is connected a decoder D*a* and D*b*, respectively, which has as many outputs as there are subscribers. Each of these outputs is assigned to a given subscriber. Upon feeding the address of a subscriber to a decoder, an impulse will be given off at the output assigned to the respective subscriber, which impulse serves to control the time channel switch which is individual to such subscriber.

The decoder D*a* is utilized both to control the time-channel switches ZS*l* . . . ZS*x* and also to read the line circuits T*sl* . . . T*sx* as to the momentary condition of operation of the respective individual subscriber lines. For this purpose, there are introduced into the cycle of the control pulses special reading impulses which are used to read the subscriber lines leading to the individual subscribers as to their condition of operation, that is, as to whether the corresponding line loop is closed or open. For the reading impulses which have a phase position of their own, as compared with the other control pulses, the addresses of all subscribers T*nl* . . . T*nx* are fed in cyclic sequence to the decoder D*a*. In order to deliver these addresses, there is provided an address register G in which the different addresses appear successively. As already described elsewhere, the addresses appear in the form of an impulse code for marking a given combination in impulse-wise manner in connection with a number of lines, with each subscriber thereby being assigned his own combination. The address register G is advanced further by one step upon termination of at least one cycle of the control pulse, whereupon the next subscriber address appears. The addresses of the subscribers thus stand in the address register G at least for the duration of one cycle of the control pulses, the address just supplied by the address register G of the subscriber just read being transmitted, however, only at a reading pulse phase $p_0$, that is, for the duration of a reading impulse, to the decoder D*a*, as is indicated in the drawing by a switch inserted in the connection which is capable of transmission (conductive) only at the reading pulse phase $p_0$. Due to the fact that the addresses of all subscribers are supplied successively by the address register G, all subscribers are thus regularly read in the manner described as to their condition of operation.

The two address comparators V*a* and V*b* are connected to the address register G as well as to the outputs of the address cycling storers U*a* and U*b*. At the output of one such address comparator V*a*, V*b*, which can be constructed of simple gates, is given off a signal as long as the two addresses present at the two inputs of the address comparator are the same. By means of such address comparators, the testing of selected subscribers as to their idle condition can be effected in a manner which is here of no further interest and which furthermore has already been described elsewhere. To these comparators V*a*, V*b*, there is connected the circuit arrangement according to the invention, the connection extending over an Or-gate GV, so that a signal appears at the output line *v* of the Or-gate GV, whenever there is identity between a subscriber address appearing at the output of an address cycling storer U*a*, U*b* and the subscriber address supplied by the address register G.

Since the address of the subscriber line which has just been read, and which is supplied by the address register G, is also transmitted, during the reading impulse, over the output of the cyclic storer U*a* and thus the input of the decoder D*a*, to the address comparator V*a*, there is also connected a blocking gate AVA directly ahead of the input of the Or-gate GV, the input of which is connected to the output of the address comparator V*a*, the blocking input of which gate receives a blocking impulse at the reading pulse phase $p_0$. This blocking gate is effective to suppress a signal given off by the address comparator V*a* at the reading pulse phase $p_0$. Furthermore, in order to receive information as to whether the subscriber line which has just been read is engaged in a call in incoming traffic, an And-gate ADB is connected ahead of the other input of the Or-gate GV, one input of said And-gate ADB being connected to the address comparator V*b* and its other input to an auxiliary storer UDB. It is assumed here that, as already described elsewhere, the address of a desired subscriber line is after its arrival at a device MM, serving to receive the selection information, recorded without testing as to idle condition in the cyclic storer U*b* and that the testing as to the idle condition is subsequently effected. In order to avoid an immediate connection with this subscriber line, without prior testing as to the idle condition thereof, there is provided at the decoder D*b* a through-switch, which in its normal position prevents the supplying of a control pulse at the pulse phase with which the address recorded in the cyclic storer U*b* is cycled. The through-switch which is merely indicated in the drawing is capable of passing a control pulse only when a control pulse is fed to it, at the corresponding pulse phase, by an auxiliary storer UDB. Such a control pulse is given off by the auxiliary storer UDB only after it has been established that the subscriber line to be called is still idle. Under the assumptions made, a subscriber whose address is recorded in the address cyclic storer U*b*, therefore, participates in a connection only when the pulse phase with which the address is cycled in the address cycling storer U*b* is marked in the auxiliary storer UDB so that the auxiliary storer UDB gives off a signal when the address appears at the output of the address cycling storer U*b*. Only then can the coincidence condition be fulfilled for the And-gate ADB. Accordingly, a signal appears on the line *v* of the circuit arrangement in accordance with the invention, only when it is found that the subscriber whose address has just been supplied by the address register G is actually participating in a connection.

The circuit arrangement shown in the drawing has a bistable flip-flop stage, the input of which is connected to the line *v* and an And-gate ADV also connected to the line $v$ and, over its other input, to the output of the flip-flop stage V. A recording storer DV for storing a signal indicating a double connection possibly given off by the gate ADV is arranged serially with respect to the gate ADV.

The circuit arrangement described so far operates as follows:

As already explained, upon the comparison of the subscriber address just supplied by the address register G with the addresses of all subscribers participating in connections which are registered in an address storer U*a*, U*b*, a signal appears on the line $v$ upon each identity of address. If a subscriber whose address has just been supplied by the address register G in the course of its address delivery cycle, for instance, the subscriber T*nx*, is just participating in a single connection with another subscriber, for instance the subscriber T*nl*, such a signal appears only once on the line $v$, namely, at the pulse phase assigned to the respective connection. This signal, which occurs on the line $v$, is effective to activate the bistable flip-flop stage V, which is placed in normal condition before the start of the address comparison, for instance at a control pulse phase $p_{-2}$. The gate ADV is however not conductive for this one signal, since its other input, connected to the output of the bistable flip-flop stage V, is for the time being still inactive.

A timing member $\delta t$ has been shown in the drawing, inserted in the connection between the output of the bistable flip-flop stage V and the input of the gate ADV connected therewith, in order to make clear what has just been stated, namely, that a first signal occurring on the line $v$ can as yet not be transmitted by the gate ADV. Such timing member $\delta t$ is intended to indicate that an impulse occurring at the input of the bistable flip-flop stage V is not already active during its duration at the input of the gate ADV connected with the output of the bistable stage V. However, it is to be noted that with appropriate design of the bistable flip-flop circuits and gates shown in the figure, such as described, for instance, in the "Entwicklungsberichten der Siemens & Halske AG," Year 22, Series 2, pages 159 to 171, August 1955, or the "Nachrichtentechnischen Fachberichten," vol. 14, 1959, pages 25 to 29, the insertion of such a timing member $\delta t$ is superfluous.

As stated, while an individual signal, occurring on the line $v$, activates the bistable flip-flop stage V, such signal cannot yet be transmitted by the successively disposed gate ADV. Accordingly, the circuit arrangement in accordance with the invention, which is intended to avoid double connections, will become operative if the subscriber T*nx*, whose address has just been supplied by the address register G, is participating in a normal single connection. However, if in addition there is another connection between the subscriber T*nx* and another subscriber, and if, therefore, the subscriber whose address has just been delivered by the address register G is participating simultaneously in two connections, then a signal occurs a second time on the line $v$. This signal will now be transmitted by the gate ADV since one input of the gate is activated from the output of the bistable flip-flop stage V and the second signal is fed from the line $v$ to the other input of the gate. Upon the occurrence, at least two times, of identity of address between the subscriber address just supplied by the address register G and an address of a subscriber participating in a connection which is recorded in an address storer U*a*, U*b*, a signal will therefore occur at the output of the gate ADV, which thus indicates that the subscriber in question whose address has just been supplied by the address register G is participating in a double connection.

This signal can now be utilized to release those connections in which the respective subscriber is participating. For this purpose, the signal indicating the double connection is first stored in the receiving storer DV. From this receiving storer DV, the signal can be transmitted over a gate GLP to a command storer SLP, the gate GLP making it possible to store the signal indicating the double connection as a command for the release of the connection as a function of a signal fed to the control input of the gate. The storing of such a command can thus be obtained at a desired instant and/or solely as a function of further conditions, for instance, based upon the fact that an intended and thus permissible connection of a third party is not involved. A signal indicating a double connection, stored in the receiving storer DV by way of the gate GLP, can therefore be transmitted at a suitable instant, for instance, shortly before the start of the next control pulse cycle, at a pulse phase $p_{-3}$, to the command storer SLP which previously, for instance, at the preceding control pulse phase $p_{-4}$, was placed into normal position. The receiving storer DV can thereupon be restored to the normal position, for instance, at a control pulse phase $p_{-2}$. The command for the release of the connections in which the subscriber, whose address has just been delivered by the address register G, is participating, is extended from the output of the command storer SLP at the instance when the serially disposed command gate LP is made conductive. Accordingly, the giving-off of the command at a desired instant is made possible by feeding a corresponding signal to the control input of the command gate LP.

The circuit arrangement in accordance with the invention, for the avoidance of double connections, will now be described in its cooperation with a time multiplex switching system shown in the drawing, in which the individual subscriber lines can be connected to a multiplex bar MS over electronic time channel switches ZS*l* . . . ZS*x* which are mutually shifted in phase and control in each case control pulses assigned to the individual connections, and in which the control pulses are produced by means of addresses indicating the subscriber lines to be connected with each other, stored in the address storers U*a*, U*b*. In order to release in such a switching system undesired double connections, the control input of the command gate LP is connected with the line $v$ over a delay line T, the delay time of which is such that the command gate LP receives a control signal at the same control pulse phase at which, during a preceding cycling of the addresses recorded in the address cycling storers U*a*, U*b*, a signal has occurred on the said line $v$. Accordingly, a command for the release of the connection is given off at the output of the command gate LP precisely with those control pulse phases with which the address of a subscriber participating in a double connection is cycled several times in the address cycling storers U*a*, U*b*. This command can then effect the release of the respective connections by causing an erasing of the addresses cycling with the respective cycling phases in the address cycling storers U*a* and U*b*, which, however, will not be further explained with reference to the figure since it is not necessary for an understanding of the invention.

It was mentioned above that the transmission of the signal, indicating a double connection, which is stored in the receiving storer DV as command for the release of the connections in question to the command storer SLP, can be made dependent on further conditions, with the aid of the gate GLP inserted between the two storers. In the event that no such conditions are to be taken into consideration and a signal indicating a double connection, therefore, is to effect in any case a release of the corresponding connections, the gate GLP and a special command storer SLP can be eliminated so that in such case the command storer is already formed by the receiving storer DV.

In conclusion, it may be pointed out that it is also possible to use for the delivery of the address of the subscriber who has just been tested as to whether or not he is participating in a double connection, instead of an address register which supplies for a given time interval in cyclic sequence the address of the subscriber line which has just been read as to its condition of operation, another address register in which appears necessarily also the address of the subscriber to be tested as to his participation in the double connection.

Changes may be made within the scope and spirit of the appended claims which define what is believed to be new and desired to have protected by Letters Patent.

We claim:

1. A circuit arrangement for avoiding double connections in a switching system, particularly in a telephone system, having storers for addresses indicating subscriber lines to be connected with each other, and having an address register for successively periodically pulse-wise reading individual subscriber lines as to their condition of operation, said address register supplying in cyclic sequence the address of a subscriber line which has just been read until termination of the switching operations which are to be carried out for the respective subscriber line, based upon its condition of operation, comprising means, effective upon the comparison of the subscriber address just supplied by the address register with addresses of subscribers participating in connections which are recorded in an address storer, for counting the cases of the occurrence of identity of address and for giving off a signal, in case of at least two occurrences of identity of address, said signal indicating a double connection, and means controlled by said signal for giving-off a command for the release of those connections in which the subscriber having the address just supplied by the address register is participataing.

2. A circuit arrangement according to claim 1, comprising an address comparator, a signal line connected with said comparator, a bistable flip-flop stage and a gate which is connected to its output and the other input of which, together with the control input of the bistable flip-flop stage, being connected to said line, a signal being transmitted from said comparator over said line upon each identity of an address recorded in an address storer, with the subscriber address just supplied by the address register, whereby a signal indicating a double connection occurs at the output of said gate responsive to a second or further occurrence of identity of address.

3. A circuit arrangement according to claim 2, comprising a receiving storer arranged serially with respect to said gate for storing the signal indicating a double connection.

4. A circuit arrangement according to claim 3, comprising a command storer and a command gate serially connected therewith for giving-off at a desired instant a command, responsive to a signal fed to the control input thereof, for effecting the release of the connections in which the subscriber whose address has just been supplied by the address register is participating.

5. A circuit arrangement according to claim 4, comprising a further gate disposed ahead of the command storer for storing a signal indicating a double connection as command for the release of a connection as a function of a signal fed to the control input of said further gate.

6. A circuit arrangement according to claim 4, wherein the receiving storer is operable to function as the command storer.

7. A circuit arrangement according to claim 6, comprising means including a delay line for connecting the control input of the command gate with said signal line, the delay time of said delay line being such that the command gate receives a control signal at the same pulse phase at which a signal has occurred on the said signal line upon a preceding control pulse cycle, and gives off responsive to such control signal the command for the connection release stored in the command storer connected ahead thereof.

References Cited by the Examiner

UNITED STATES PATENTS

| | | | |
|---|---|---|---|
| 2,910,540 | 10/1959 | Van Mierlo et al. | 179—15 |
| 3,185,772 | 5/1965 | Edstrom | 179—18 |
| 3,210,478 | 10/1965 | Klees et al. | 179—18 |
| 3,231,680 | 1/1966 | Yamato et al. | 179—18.3 |

KATHLEEN H. CLAFFY, *Primary Examiner.*

L. A. WRIGHT, *Assistant Examiner.*